(12) United States Patent
Lennox

(10) Patent No.: US 10,090,687 B1
(45) Date of Patent: Oct. 2, 2018

(54) BATTERY WITH INTEGRATED CIRCUIT BREAKER SWITCH

(71) Applicant: SimpliPhi Power, Incorporated, Ojai, CA (US)

(72) Inventor: Stuart B. Lennox, Ojai, CA (US)

(73) Assignee: Simpliphi Power, Incorporated, Ojai, CA (US)

( * ) Notice: Subject to any disclaimer, the term of this patent is extended or adjusted under 35 U.S.C. 154(b) by 99 days.

(21) Appl. No.: 15/068,174

(22) Filed: Mar. 11, 2016

Related U.S. Application Data

(60) Provisional application No. 62/150,173, filed on Apr. 20, 2015.

(51) Int. Cl.
  *H02J 7/00* (2006.01)
  *H02J 7/35* (2006.01)
  *H02J 3/38* (2006.01)

(52) U.S. Cl.
  CPC ............ *H02J 7/0026* (2013.01); *H02J 3/386* (2013.01); *H02J 7/007* (2013.01); *H02J 7/0021* (2013.01); *H02J 7/0042* (2013.01); *H02J 7/35* (2013.01); *H02J 2007/0096* (2013.01)

(58) Field of Classification Search
  CPC ........ H02J 7/0026; H02J 3/386; H02J 7/0021; H02J 7/0042; H02J 7/007; H02J 7/35
  See application file for complete search history.

(56) References Cited

U.S. PATENT DOCUMENTS

| | | | |
|---|---|---|---|
| 6,686,722 B2 | 2/2004 | Watanabe et al. | |
| 2002/0080546 A1 | 6/2002 | Zdziech | |
| 2016/0016482 A1* | 1/2016 | Lee | B60L 11/1861 701/22 |
| 2016/0258836 A1* | 9/2016 | Raman | G01M 5/0066 |

OTHER PUBLICATIONS

"Application Note 5, Solid State Circuit Breakers", Brenda Kovacevic, Micrel, 1997, pp. 5-206 to 5-212.

* cited by examiner

*Primary Examiner* — Vuthe Siek

(57) ABSTRACT

One aspect of this disclosure is directed to a power system controller. This embodiment comprises a controller having a programmable microprocessor and memory associated therewith, and one or more rechargeable batteries each located within a battery case and connected in parallel to the controller. Each of the rechargeable batteries has a circuit breaker located within the battery case. The circuit breaker has a bidirectional current sensor connected to the controller, and the controller is configured to operate the bidirectional current sensor to manage a current flow to and from one or more of the rechargeable batteries.

20 Claims, 3 Drawing Sheets

BATTERY WITH INTEGRATED CIRCUIT BREAKER SWITCH

CROSS-REFERENCE TO RELATED APPLICATION

This application claims the benefit of U.S. Provisional Application Ser. No. 62/150,173, filed by Stuart B. Lennox on Apr. 20, 2015, entitled "BATTERY WITH INTEGRATED CIRCUIT BREAKER SWITCH," commonly assigned with this application and incorporated herein by reference.

TECHNICAL FIELD

This application is directed to a battery having an integrated circuit breaker and a battery management system (BMS) that uses the integrated circuit breaker in individual batteries to help control and manage electrical power within a power management system.

BACKGROUND

For both environmental and energy conservation reasons, auxiliary DC battery power systems are beginning to be widely used in not only commercial applications, such as telecommunication network systems, but residential applications, as well. The battery power systems may be used to provide temporary power when the main power source, typically AC power goes out. In addition, these systems are often used in conjunction with other alternative power sources, such as solar and wind turbines that can be used to re-charge the battery systems. Many of these battery systems rely on circuit breakers in the battery circuit to serve to protect and electrically isolate a string of batteries. For multi-string battery plants, the trend is to provide a disconnect circuit breaker for each battery string, rather than using a common circuit breaker for the entire battery bank. Individual circuit breakers help isolate the faulty string.

In such systems, each battery string is provided with a separate disconnect circuit breaker, which serves to isolate the faulty battery string during overcurrent conditions and prevents problems in the string from affecting the other strings, chargers, circuit cables, and connected DC load. Thus, in such applications, the circuit breaker protects the system from overcurrent conditions.

SUMMARY

One aspect of this disclosure is directed to a power system controller. This embodiment comprises a controller having a programmable microprocessor and memory associated therewith, and one or more rechargeable batteries each located within a battery case and connected in parallel to the controller. Each of the rechargeable batteries has a circuit breaker located within the battery case. The circuit breaker has a bidirectional current sensor connected to the controller, and the controller is configured to operate the bidirectional current sensor to manage a current flow to and from one or more of the rechargeable batteries.

In another aspect, this disclosure is directed to a battery that can be used in a power management system. In this embodiment, the battery comprises a battery management system (BMS) controller having a programmable microprocessor and memory associated therewith located on or within a battery case. The battery further comprises one or more rechargeable battery cells located within the battery case that are connected in parallel to the BMS controller. The battery further comprises a circuit breaker located within the battery case that is connected to the BMS controller. The circuit breaker has a bidirectional current sensor connected to the BMS controller. The BMS controller is configured to operate the bidirectional current sensor to manage a current flow to and from one or more of the rechargeable battery cells.

BRIEF DESCRIPTION

Reference is now made to the following descriptions taken in conjunction with the accompanying drawings, in which.

DETAILED DESCRIPTION

Figure 1:
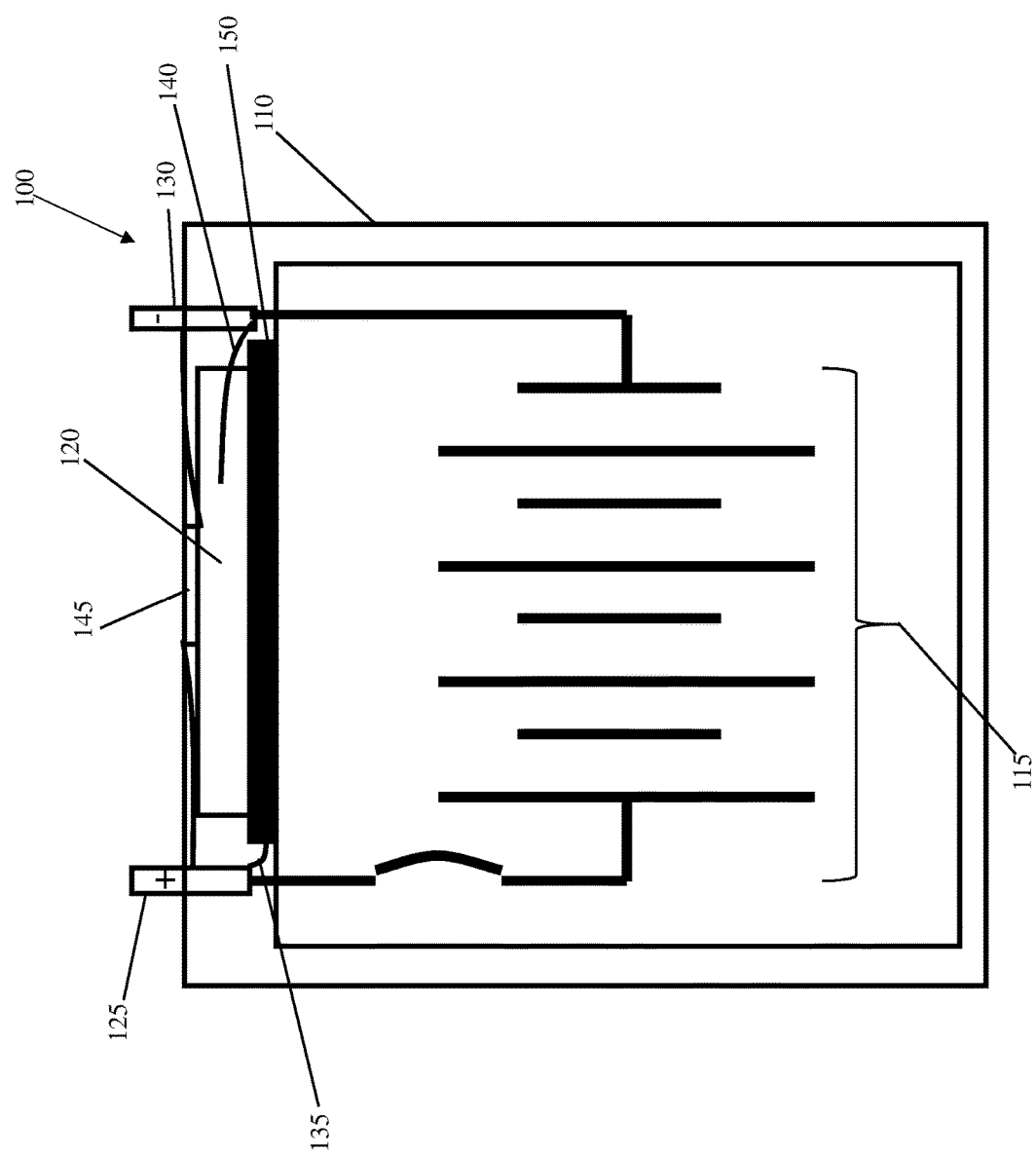
FIG. 1 illustrates an embodiment of a battery as provided by this disclosure.

FIG. 1, illustrates a battery 100 that can be used in a battery power system. The battery 100 is contained within a battery case 110 and comprises plates or cell 115. The battery 100 includes a conventional battery management system (BMS) 120 that is conductively connected to positive and negative mounting posts 125 and 130 by conductors 135 and 140, respectively. The battery 100 further comprises a circuit breaker 145, as discussed below, that is connected to the BMS 120. The circuit breaker 145 is a separate component and is not incorporated into, and thus, does not form a part of the BMS 120. As used herein and in the claims, connected means that the devices are connected by either a conductor, such as hardwire or conductive trace, or by a wireless system.

The circuit breaker 145 functions independently of the BMS 120 and acts as the first line of defense to the BMS 120 for over current surge protection. The BMS 120 and the separate circuit breaker 145 are mounted within the battery case 110 by a mounting plate 150. The construction and design of the circuit breaker 145 may be solid-state, electromechanical, or thermal magnetic. For example, in one embodiment, the circuit breaker 145 is an 80 amp thermal magnetic circuit breaker and is integrated into the power electronics of the battery 100. The circuit breaker 145 replaces the necessity of the installer wiring the same type of circuit breaker into the electrical system of the installation, external to the battery, which is in contrast to a typical poly-switch circuit breaker that is integrally formed into a circuit board of the BMS 120. The circuit breaker 145 protects the battery 100 and BMS 120 from unmitigated voltage, amperage, and heat from other components and power generation equipment in a hybrid system. Additionally, it decreases the possibility of battery overheating, wires melting and/or fire, and increases safety for installation technician, end user and for shipping carriers. The circuit breaker 145 creates shut-off function for individual batteries built into a battery bank and optimizes efficacy and longevity of the BMS 120 and battery cells 115. Also, the circuit breaker 145 increases access to batteries in emergency scenarios.

Figure 2:
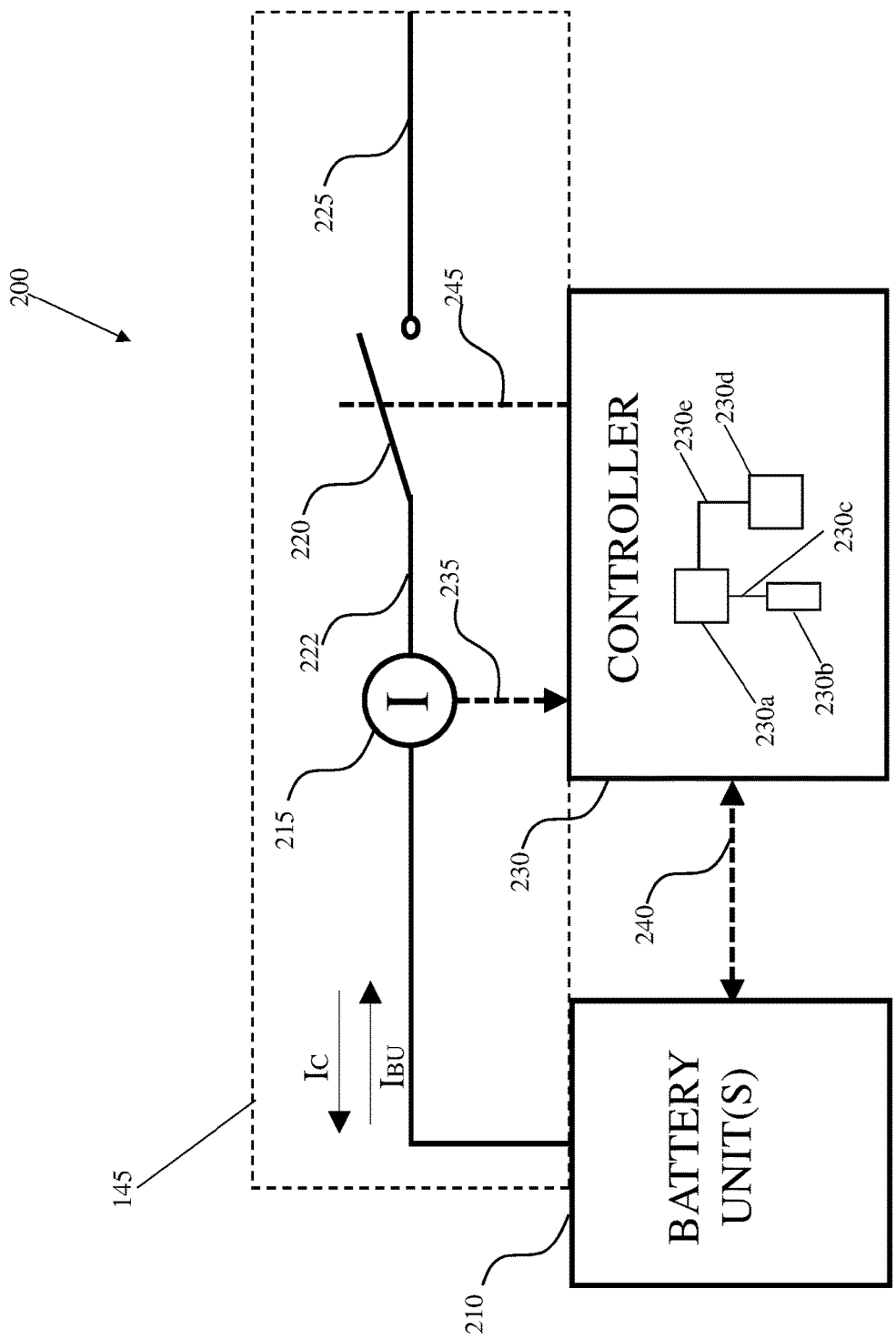
FIG. 2 illustrates an embodiment of a power system as provided by this disclosure.

FIG. 2 illustrates a schematic diagram of one embodiment of a power management system 200 that includes the above-referenced circuit breaker 145, shown generally by the dashed line. In this embodiment, the circuit breaker 145 is connected to a battery unit 210, such as the one described above, through a bidirectional current sensor 215 through which a charging current $I_C$ passes to the battery unit 210 or through which output current $I_{BU}$ leaves the battery unit 210. A conductor wire or trace 222 connects the bidirectional current sensor 215 to a circuit breaker switch 220. As used herein and in the claims, a conductor means a conductive wire, for example hardwire, or conductive trace, such as a trace within a semiconductor device or printed wire circuit board. When in a closed, or on, position, the switch is connected to an input/output lead 225 that allows current to enter the battery unit 210 from a power source (not shown) or leave the battery unit 210 to a load (not shown). In the open, or off, position, current cannot flow to or from the battery unit 210.

The power management system 200 further includes a controller 230. In one embodiment, the controller 230 includes a programmable microprocessor 230a that has or is connected to an accessible memory 230b by a conductor 230c. Though the memory 230b is shown to a separate chip or device, those skilled in the art will understand that the memory 230b may also be contained within the same package as, or be an integral part of the microprocessor 230a. In one embodiment, the controller 230 may further include wireless circuitry 230d, including an antenna (not shown) that is connected to the microprocessor 230a by a conductor 230e. The microprocessor and the wireless circuitry 230d cooperate to send signals from the controller's microprocessor 230a wirelessly, so it may communicate over a wireless network, such as a local area network or the internet cloud.

The controller 230 receives a bidirectional current sensing signal 235 from the bidirectional current sensor 215 that may be carried over a conductive wire or trace, or wirelessly. The controller 230 is configured to operate the bidirectional current sensor to manage a current flow to and from one or more of the rechargeable batteries. As used herein and in the claims, "configured" means that the stated device is designed to perform the stated function(s) and has the necessary hardware and other structural components, and/or programming to perform the stated function(s). As used herein and in the claims "manage" means that the controller 230 couples or decouples an electric generator or load from the power management system 200 or couples or decouples one or more of the battery units 210 from the electric generator or load to control or adjust the amount of current flowing through the power management system 200 at any given time. As explained below, the controller 230 may perform the coupling or decoupling operations for a number of reasons.

The controller 230 also receives a bidirectional current sensing or control signals 240 from the battery unite 210 that may be carried over a conductive wire or trace, or wirelessly. In one embodiment, the controller 230 is a separate control from the BMS 120 discussed above, and in another embodiment, the controller 230 may be integrated into or be a part of the BMS 120. During the management of the battery unit(s) 210, the controller 230 sends a circuit breaker switch control signal to the switch 220 to either open or close the switch, depending on the desired management parameters.

Figure 3:
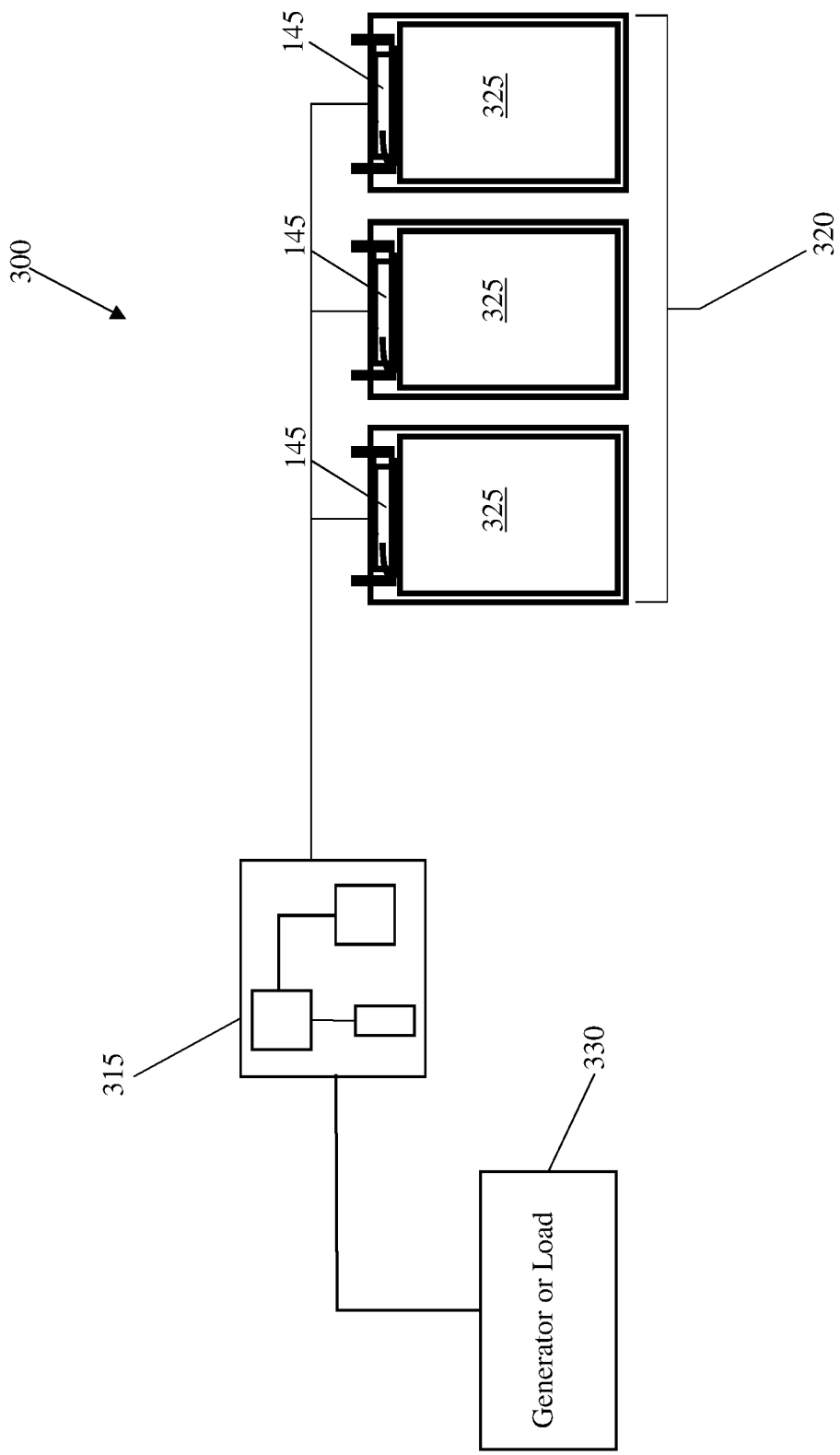
FIG. 3 illustrates is a power control system as provided by this disclosure.

FIG. 3 illustrates one embodiment of a power system 300 in which a controller 315, as discussed above, is implemented. In the illustrated embodiment, the controller 315 is connected in parallel to one or more rechargeable batteries 320 contained within a battery case 325, such a the embodiments of the battery 100 discussed above regarding FIG. 1. Each one of the batteries 320 has the circuit breaker 145, as discussed above, located within the battery case 325 and that is connected to the controller 315. As noted above, each of the batteries 320 may include a BMS that is connected to the controller 315 to further manage the current flow to and from each of the batteries 320. As seen in this illustrated embodiment, the controller 315 is connected to an electric generator or load 330 and manages the overall current of the power system 300 in the various ways described herein.

With reference to FIG. 1, in certain embodiments, the BMS 120 is generally configured to control battery charging and discharging and monitor battery parameters to detect or predict conditions that may cause harm to the battery 100 or battery aging. More specifically, various embodiments of the BMS 120 may be configured to control the rate at which a battery is charged to minimize the time required to recharge the battery 100 or maximize the amount of charge stored in the battery 100. Additionally, the BMS 120 may be configured to optimize between recharge time and stored charge, charge at some desired rate and/or over some desired time, or adjust rates of charge t batteries age and their charge characteristics change. Various embodiments of the BMS 120 may also, or alternatively, be configured to control the rate at which a battery 100 is discharged to maximize the current derived from the battery 100, maximize the charge derived from the battery 100 over a given charge cycle, limit the rate at which a battery is discharged to maintain a desired terminal voltage, or adjust rates of discharge as batteries age and their discharge characteristics change. Various embodiments of BMS 120 may also, or alternatively, detect or predict undesirable conditions, such as excessive charge or discharge rates, excessive performance degradation, excessive or insufficient ambient temperature, reverse polarity, thermal runaway, or imminent or actual battery failure.

With reference to FIGS. 1 and 2, in various embodiments, the circuit breaker 145 disclosed herein is coupled to the BMS 120 to allow the BMS 120 to control the circuit breaker 145. In such embodiments, the BMS 120 is configured to operate the bidirectional current sensor 215 of the circuit breaker 145 to manage a current flow to and from one or more of the rechargeable battery cells 15 to control the rate at which the battery 100 is charged by coupling and decoupling the battery 100 from the an electric generator (also referred to herein as a "charger"), as desired. Also or alternatively, the BMS 120 may operate the circuit breaker 145 to control the rate at which the battery 100 is discharged by coupling and decoupling the battery 100 from the load as desired. Also or alternatively, the BMS 120 may operate the circuit breaker 145 to protect the battery 100 or its charger or load from an undesirable condition. For example, the BMS 120 may open ("trip") the circuit breaker 145 to decouple the battery 100 in the event of an excessive charge or discharge rate, an excessive or insufficient ambient temperature, a reverse polarity, a thermal runaway or an imminent battery failure.

In further embodiments, the BMS 120 senses current flowing through the circuit breaker 145 and adjusts charge or discharge rates by controlling the charger or the load to prevent the circuit breaker 145 from tripping. In still further embodiments, the BMS 120 may gather data from the circuit breaker 145, such as current across the circuit breaker 145 or manual trip events and store such data for later analysis or cause such data to be transmitted to a remote destination for analysis or action of some sort.

With reference to FIGS. 1, 2 and 3, as discussed above, one or more batteries 100 may be coupled to a system controller 230, 315. The system controller 230, 315 may vary widely in terms of what and how it is designed to control. For example, the system controller 230, 315 may control one or more of a battery, an inverter, a photovoltaic (PV) array, a wind turbine and a generator to provide a reliable source of electricity that is not dependent upon connection to an electrical grid. The system controller 230, 315 may be configured to control one or more loads 330 connected to the source of electricity as well. The system controller 230, 315 may be configured to control the PV array, the wind turbine and the generator in concert to charge the battery and/or provide power to the invertor under different conditions of sunlight, wind, fuel and demand for power. Also, or alternatively, the system controller 230, 315 may be configured to control the battery and the inverter to optimize the same for a given load demand, perhaps taking into account the availability of the PV array, the wind turbine and the generator. Of course, other sources of electric power may be included as well, such as hydroelectric, geothermal or atomic, but those skilled in the art will understand how the control of those sources may be integrated under a system controller.

System controller 230, 315 may also be used to detect, predict and control system operation to guard against undesirable conditions. For example, a system controller 230, 315 may derate, decouple, or reconfigure components of the systems they control to isolate faulty components or isolate or change the operation of components that are being called upon to operate outside their specifications.

In various embodiments, the circuit breaker 145 disclosed herein is coupled to a system controller 230, 315 to allow the system controller 230, 315 to control the circuit breaker. In a related embodiment, the circuit breaker 145 is further connected to a BMS 120, in which case the system controller 230, 315 may control the circuit breaker 145 directly or through the BMS 120. In such embodiments, the system controller 230, 315 may toggle the circuit breaker 145 to control the rate at which a battery is charged by coupling and decoupling the battery from the charger (e.g., the PV array, the wind turbine or the generator) as desired. Also, or alternatively, the system controller 230, 315 may toggle the circuit breaker 145 to control the rate at which a battery is discharged by coupling and decoupling the battery 100 from the load (e.g., the inverter) as desired or may alter the operation of the inverter to control the rate at which the battery 100 is discharged. Also or alternatively, the system controller 230, 315 may toggle the circuit breaker 145 to protect the battery 100 or its charger or load from an undesirable condition. For example, the system controller 230, 315 may toggle off ("trip") the circuit breaker 145 to decouple the battery 100 in the event of an excessive charge or discharge rate, an excessive or insufficient ambient temperature, a reverse polarity, a thermal runaway or an imminent battery failure.

In further embodiments, a system controller 230, 315 senses current flowing through the circuit breaker 145 and adjusts charge or discharge rates by controlling the charger or the load to prevent the circuit breaker 145 from tripping. In still further embodiments, a system controller 230, 315 may gather data from the circuit breaker 145, such as current across the circuit breaker 145 or manual trip events and store such data for later analysis or cause such data to be transmitted to a remote destination for analysis or other action. Further, the system controller may employ circuit breaker 145 during system installation or configuration by ensuring that the circuit breaker 145 is toggled off until the system controller has confirmed that the system has been correctly assembled, only then toggling on to couple the battery electrically to the remainder of the system. Such structured coupling of a system would be expected to protect the person(s) assembling the system as well as the components of the system themselves.

Those skilled in the art to which this application relates will appreciate that other and further additions, deletions, substitutions and modifications may be made to the described embodiments.

What is claimed is:

1. A power system controller, comprising:
a controller having a programmable microprocessor and memory associated therewith;
one or more rechargeable batteries each located within a battery case and connected in parallel to said controller, each of said one or more rechargeable batteries having a circuit breaker switch located within said battery case, said circuit breaker switch having a bidirectional current sensor connected to said controller, said controller configured to repeatedly toggle said circuit breaker switch to manage a current flow to and from said one or more rechargeable batteries.

2. The battery controller system of claim 1, further comprising a battery management system (BMS) located within said battery case and connected to said controller.

3. The battery controller system of claim 2, wherein said controller is wirelessly connected to said BMS and controls said circuit breaker switch through said BMS.

4. The battery controller system of claim 1, wherein said controller is configured to repeatedly toggle said circuit breaker switch to control a rate at which one or more of said rechargeable batteries are charged or discharged.

5. The battery controller system of claim 1, wherein said controller is configured to manage said current flow by repeatedly toggling said circuit breaker switch thereby coupling and decoupling one or more of said one or more rechargeable batteries from an electric generator or an electrical load.

6. The battery controller system of claim 5, further comprising an electric generator connected to said controller and connected to said one or more rechargeable batteries by hardwire.

7. The battery controller system of claim 6, wherein said electric generator is a photovoltaic array or a wind turbine generator.

8. The battery controller system of claim 1, wherein said controller is wirelessly connected to said bidirectional current sensor of each circuit breaker switch of said one or more rechargeable batteries.

9. The battery controller system of claim 1, wherein said controller is configured to automatically open said circuit breaker switch when said current flow exceeds a predetermined threshold value.

10. The battery controller system of claim 9, wherein said controller is configured analyze said current flow after it automatically opens said circuit breaker switch, and close said circuit breaker switch if said current flow is below said predetermined threshold value.

11. A battery, comprising:
a battery management system (BMS) controller having a programmable microprocessor and memory associated therewith located on or within a battery case; and
one or more rechargeable battery cells located within said battery case and connected in parallel to said BMS controller;
a circuit breaker switch located within said battery case and connected to said BMS controller, said circuit breaker switch having a bidirectional current sensor connected to said BMS controller, said BMS controller configured to repeatedly toggle said circuit breaker switch to manage a current flow to and from said one or more rechargeable battery cells.

12. The battery of claim 11, wherein said BMS includes wireless circuitry coupled to an antenna.

13. The battery of claim 11, wherein said BMS controller is configured to control a rate at which one or more of said rechargeable battery cells are charged or discharged.

14. The battery of claim 11, wherein said BMS controller is connected by hardwire to an electric generator or an electric load and is configured to manage said current flow by repeatedly toggling said circuit breaker switch thereby coupling and decoupling one or more of said one or more rechargeable battery cells from said electric generator or said electrical load.

15. The battery of claim 14, wherein said electric generator is a photovoltaic array or a wind turbine generator.

16. The battery of claim 11, wherein said BMS controller is connected to a power system controller.

17. The battery of claim 11, wherein said BMS controller is configured to automatically open said circuit breaker switch when said current flow exceeds a predetermined threshold.

18. The battery of claim 17, wherein said BMS controller is configured to analyze said current flow after said bidirectional current sensor automatically opens said circuit breaker switch and close said circuit breaker switch if said current flow is below said predetermined threshold.

19. The battery of claim 11, wherein said BMS controller is configured to monitor one or more operational conditions of said battery, wherein said one or more operational conditions a change in charge or discharge rates, performance degradation, ambient temperature, or polarlity.

20. The battery of claim 11, wherein said BMS controller is configured to gather and store data received from said current sensor.

* * * * *